United States Patent
McCarthy et al.

(10) Patent No.: US 6,708,282 B1
(45) Date of Patent: Mar. 16, 2004

(54) METHOD AND SYSTEM FOR INITIATING COMPUTATION UPON UNORDERED RECEIPT OF DATA

(75) Inventors: Dominic Paul McCarthy, Los Altos, CA (US); Jack Choquette, Mountain View, CA (US)

(73) Assignee: Raza Microelectronics, Inc., San Jose, CA (US)

( * ) Notice: Subject to any disclaimer, the term of this patent is extended or adjusted under 35 U.S.C. 154(b) by 529 days.

(21) Appl. No.: 09/654,759

(22) Filed: Sep. 5, 2000

(51) Int. Cl.[7] .................... G06F 13/42; G06F 1/14; G06F 15/00
(52) U.S. Cl. .................... 713/400; 713/502; 712/32
(58) Field of Search ................... 713/400, 500, 713/502; 712/32, 36; 708/100

(56) References Cited

U.S. PATENT DOCUMENTS 6,307,572 B1 * 10/2001 DeMarcken et al. ........ 345/763
6,487,369 B1 * 11/2002 Sato ........................... 396/52

FOREIGN PATENT DOCUMENTS

JP          56168904 A   * 12/1981   ........... B21B/37/00

OTHER PUBLICATIONS

Drummond et al, Intelligent Browsing for Multimedia Applications, 1996 IEEE, pp. 386–389.*

* cited by examiner

Primary Examiner—Thomas M. Heckler
Assistant Examiner—Suresh K Suryawanshi
(74) Attorney, Agent, or Firm—Fernandez & Assoc, LLP

(57) ABSTRACT

In complex systems, the arrival of data to a computation component is difficult to predict. A method of synchronizing the initiation of computation with the reception of its input data is disclosed. The method allows the input data and computation initiation commands to arrive in any order. The method is dynamically adjustable allowing for varying numbers of data inputs.

15 Claims, 2 Drawing Sheets

METHOD AND SYSTEM FOR INITIATING COMPUTATION UPON UNORDERED RECEIPT OF DATA

FIELD OF INVENTION

The invention pertains to the field of synchronizing communications between components directed from a scheduler.

BACKGROUND

Many systems are designed as a plurality of communicating computational components. In order to perform computation, an individual component must receive its input data from other components. Often, this data is itself the result of computation by those components and other components. The time required to perform computation by each component is not always uniform, resulting in some data being available before other data. The early data must be stored until the later data becomes available. Only when all of the data is available can computation proceed. Coordinating the transferring, storing and computing of data is a scheduling problem.

Solving the scheduling problem is a task for the system designer. Ad-hoc uncoordinated techniques are adequate for simple systems. However, as the complexity of the system grows, these techniques become inadequate.

One solution to this problem is to create one or more schedulers that are responsible for synchronizing the components transferring, storing and computing of data. This requires that each component have a synchronizing unit responsive to the scheduler. This unit must be able to receive scheduler commands, determine when the necessary data has arrived, and initiate component computation. It must be able to do this with varying numbers of data inputs, varying arrival times of the individual data inputs and varying computational times.

SUMMARY OF THE INVENTION

A method is disclosed for synchronizing the initiation of computation when receipt of the input data can occur in an unpredictable order. A scheduler directs a component to receive input data and to begin computation upon receipt thereof. The input data and scheduler direction may arrive in any order.

In a preferred embodiment, the scheduler informs a component of the number of input data operands required for a computation. The component initiates the computation after reception of the indicated number of input data operands. The component can receive the input data operands and scheduler command in any order.

In an alternate embodiment, individual input data operands are uniquely tagged. The scheduler informs a component of the identities of the input data operands required for a computation. The component initiates the computation after reception of the identified input data operands. The component can receive the input data operands and the scheduler command in any order.

DETAILED DESCRIPTION OF THE PREFERRED EMBODIMENT

A method for synchronizing the initiation of computation is disclosed. In the following descriptions, numerous specific details are set forth, such as the specific rendering of the implementation, in order to provide a thorough understanding of the present invention. It will be apparent, however, to one skilled in the art that the present invention may be practiced without these specific details. In other instances, well-known circuits, control logic and coding techniques have not been shown in detail, in order to avoid unnecessarily obscuring the present invention.

As understood herein the term computation is broadly construed to mean a transformation of input data into output data including, arithmetic calculation, compression, decompression, signal processing, and others.

Figure 1:
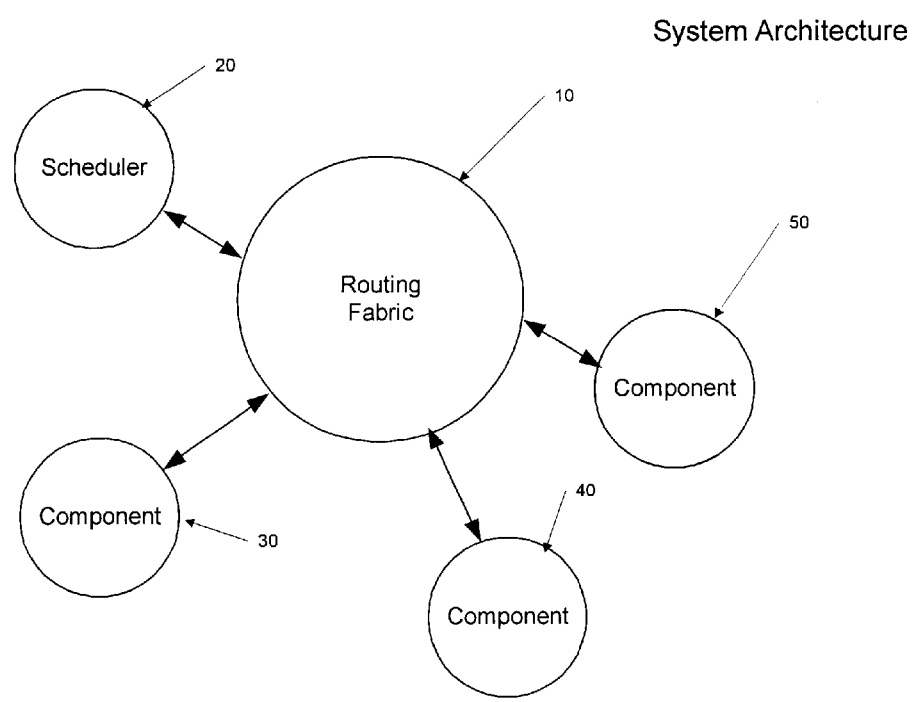
FIG. 1 shows a system of communicating computational components

FIG. 1 depicts a system of communicating computation components. Scheduler 20 and components 30, 40, and 50 are connected to routing fabric 10. Routing fabric 10 provides the communication pathways between scheduler 20 and components 30, 40, and 50. In the preferred embodiment, routing fabric 10 is point-to-point, however, it can be constructed using any interconnection scheme. It should be understood that the principles of the disclosed invention are applicable to systems with other than three components or more than one scheduler.

Scheduler 20 manages the flow of data and computations within the system by issuing commands to components 30, 40, and 50, directing the sending of output data, receiving of input data, and initiation of computation. Components 30, 40 and 50 store the commands until they can be executed.

The amount of time required to perform each command may not be predictable. Many factors contribute to the time varying nature of commands including data transmission delays, unpredictable sizes of input and output data, data dependent computations, and others. These factors combine to vary the order of command execution by components 30, 40, and 50.

Figure 2:
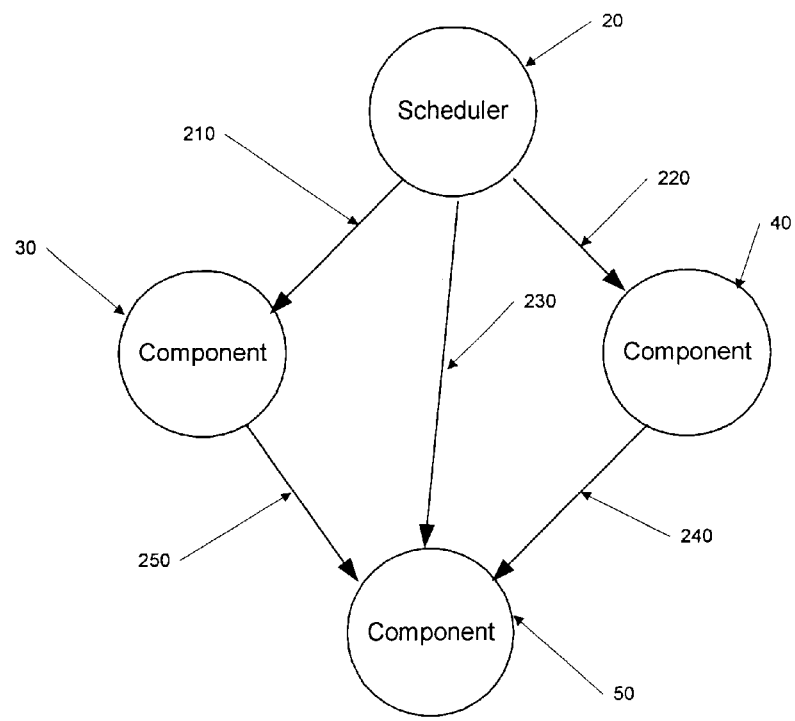
FIG. 2 shows an example sequence of commands.

FIG. 2 shows an example sequence of operations directed by scheduler 20. Scheduler 20 issues three commands. First, command 210 is sent, ordering component 30 to transfer a first block of data to component 50. Second, command 220 is sent, ordering component 40 to transfer a second block of data to component 50. Third, command 230 is sent, ordering component 50 to receive the first and second blocks of data and begin a computation. In FIG. 2, the transfer of the first block of data from component 30 to component 50 is labeled 250. The transfer of the second block of data from component 40 to component 50 is labeled 240. Due to the factors cited above, many different time orderings of the three commands are possible. In one case, transfer 240 completes before transfer 250. In another case, transfer 250 might complete first. Transfer 240 might complete before or after the reception of command 230 by component 50. Regardless of the execution order, computation cannot be initiated until transfers 240 and 250 are received by component 50.

Many systems operate in a pipelined or double-buffered manner. In these systems, data transfer is overlapped with computation. In some cases, the transfer of data to a component for its next step will complete while the component's computation is still busy from a previous command. The initiation of computation must be delayed until the component becomes available.

Figure 3:
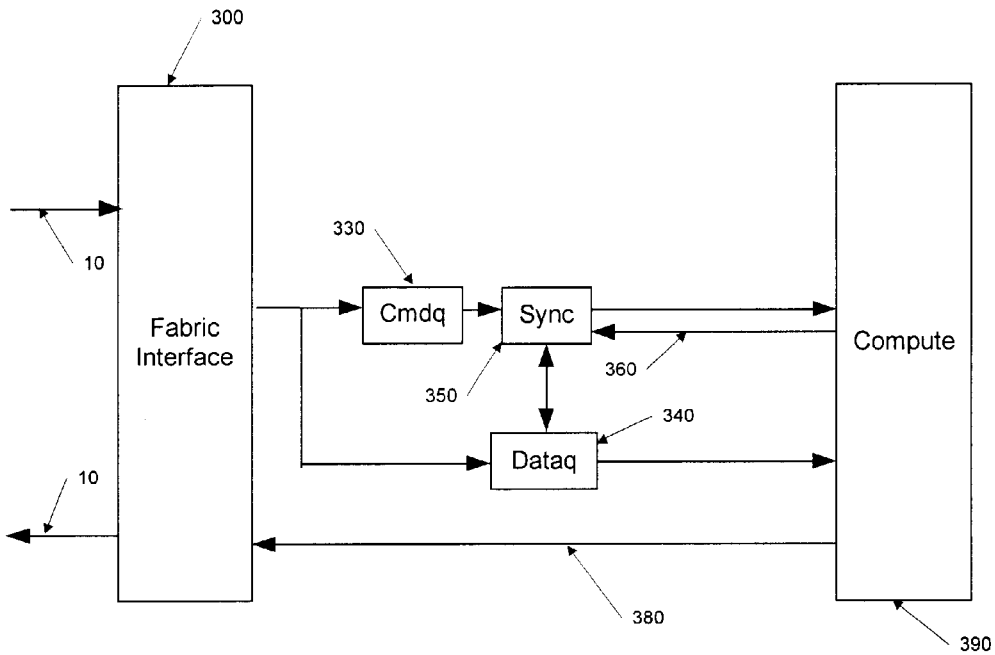
FIG. 3 shows a detailed view of a computational component.

FIG. 3 is a detailed view of a computational component. Fabric interface 300 provides the necessary connectivity and protocols to connect to routing fabric 10. Commands received from scheduler 20 are stored in command queue 330. Received input data is stored in data queue 340. Compute available signal 360 indicates the ability of compute 390 to initiate a computation. Synchronization unit 350 receives commands from command queue 330. Commands that initiate computation are delayed by synchronization unit 350 until all required data is present and compute available signal 360 indicates the ability to initiate a computation.

Synchronization unit 350 must determine that all necessary input data is present. In a preferred embodiment, a signed counter is maintained. Receipt of data from routing fabric 10 decrements the counter. Commands that initiate computation increment the counter by N, the number of inputs required by the computation. If the counter is non-zero, no computation may be initiated. A positive value for the counter indicates that additional input data is required. A negative value for the counter indicates that input data has been received before its associated computation command.

In the preferred embodiment, N is contained in the command itself. In an alternate embodiment, synchronization unit 350 could determine N by decoding the computation command.

An alternate embodiment of synchronization unit 350 contains two bit-strings. Input data that is received from routing fabric 10 is uniquely tagged, indicating a bit position in a bit-string. Commands that initiate computation indicate a first bit-string, identifying the required input data by setting the bit position associated with the tag of that input data to a one. A second bit-string is maintained, indicating which input data have been received. Bit positions within the second bit-string corresponding to received input data contain a one. Bit positions within the second bit-string corresponding to input data not yet received contain a zero. Upon receipt of input data, the bit in the second bit-string indicated by the tag is set to a one. When each bit position that is a one in the first bit-string is also a one in the second bit-string then the computation command can be initiated.

In the foregoing specification, the invention has been described with reference to a specific exemplary embodiment and alternative embodiments thereof It will, however, be evident that various modifications and changes may be made thereto without departing from the broader spirit and scope of the invention as set forth in the appended claims. The specification and drawings are, accordingly, to be regarded in an illustrative rather than a restrictive sense. The techniques of this invention can be implemented in various ways including: logic gates, field-programmable gate array, application specific integrated circuit, and others.

What is claimed is:

1. A method of synchronization comprising the steps of:
   receiving a first command to transfer a first block of data;
   receiving a second command to transfer a second block of data; and
   receiving a third command to receive the first and second blocks of data; and
   after receiving the first and second blocks of data, initiating a computation;
   wherein in a first instance, the second block of data is received before receiving the first block of data; and wherein in a second scenario, the first block of data is received before receiving the second block of data.

2. The method of claim 1 further including the step of:
   prior to the initiating the computation, waiting for an available computation indication.

3. The method of claims 2 further including the step of:
   adjusting a counter upon receiving said block of data.

4. A synchronization system, comprising:
   a scheduler sending a first command, a second command, and a third command;
   a first component receiving the first command to transfer a first block of data;
   a second component receiving the second command to transfer a second block of data; and
   a third component receiving the third command to receive the first and second blocks of data and to begin a computation, wherein the third component does not initiate the computation until the third component received the first and second blocks of data.

5. A synchronization system, comprising:
   a scheduler for generating one or more commands;
   a routing fabric coupled to the scheduler for receiving one or more input data operands that are uniquely tagged;
   a fabric interface having an input coupled to the routing fabric, a first output coupled to the routing fabric, and a second output;
   a command queue having an input coupled to the fabric interface, the command queue receiving and storing the one or more commands;
   a data queue having an input coupled to the fabric interface for receiving an input data, a second input, a first output, and a second output; and
   a synchronization unit having a first input coupled to the output of the command queue, a second input and a first output coupled to a compute block, a third input and a second output coupled to the second input and the first input of the data queue wherein commands that initiate computations are delayed by the synchronization unit until receiving the input data operands and receiving a compute available signal.

6. The system of claim 5, wherein the synchronization unit comprises a signed counter.

7. The system of claim 5, wherein the signed counter is decremented if data is received by the routing fabric.

8. The system of claim 7, wherein the signed counter is incremented by N counts if N commands are received.

9. The system of claim 8, wherein the synchronization unit does not generate a compute available signal if the signed counter is non-zero.

10. The system of claim 9, wherein a positive value of the signed counter indicates that additional input data is required.

11. The system of claim 10, wherein a negative value of the signed counter indicates that input data has been received before an associated computational command is received.

12. The system of claim 5, wherein the synchronization unit comprises two bit-strings having a first bit-string and a second bit-string.

13. The system of claim 12, wherein first bit-string identifies the required input data by setting the bit position associated with the tag of the input data to a one.

14. The system of claim 13, wherein the second bit-string indicates which input data have been received.

15. The system of claim 14, wherein the input data received from the routing fabric is uniquely tagged, indicating a bit position in the two bit-string.

* * * * *